Patented Aug. 18, 1953

2,649,421

UNITED STATES PATENT OFFICE 2,649,421

SYNTHETIC SUBSTANCES OF THE POLYSACCHARIDE TYPE

Maurice Stacey and William George Overend, Birmingham, England, assignors, by mesne assignments, to Dextran Limited, Aycliffe, Darlington, England, a British company No Drawing. Application November 1, 1950, Serial No. 193,526. In Great Britain November 22, 1949

13 Claims. (Cl. 260—9)

This invention has for its object to produce synthetic substances of the polysaccharide type.

In general, the invention consists in the conversion of an alkyl furanoside of a 2-desoxy aldose, by heating to a temperature at which alkyl alcohol is evolved and a condensation reaction sets in.

In particular, the invention consists in treating either a 2-desoxy pentose or -hexose for a short time with a very dilute solution of dry hydrogen chloride in dry methanol to provide the corresponding methyl glycofuranoside, namely, $\alpha\beta$-methyl 2-desoxy-pentofuranoside, or $\alpha\beta$-methyl 2-desoxy-hexofuranoside, and heating to a temperature at which methyl alcohol is evolved and a condensation reaction sets in.

The substances produced by the invention are hard glassy polymers having a polysaccharide structure, consisting of either 2-desoxy pentofuranose units linked together through $C_1$ and $C_5$, or 2-desoxy hexofuranose units linked together through $C_1$ and $C_6$. When these polymers are baked in high vacuum some increase of molecular weight results.

In one example, 2-desoxy-D-galactose (2.5 g.) was dissolved in absolute methanol (60 c. c.), and 0.05% methanolic hydrogen chloride (0.6 c. c.) was added. The ensuing reaction was inspected polarimetrically and was arrested at the maximum laevorotatory value by adding silver carbonate and silver oxide. The solution was filtered through a charcoal pad and then concentrated under diminished pressure. The syrupy residue was non-reducing to Fehling's solution and was $\alpha\beta$-methyl 2-desoxy-D-galactofuranoside. On rapid heating distillation resulted, but on slow heating (at 190°/0.4 mm.) polymerisation occurred and a hard brittle glassy substance was formed. With this example the optical rotation can be used as a rough guide to the degree of polymerisation, since it has been noted that the more positive the rotation the greater the molecular weight. The resulting polymer was soluble in water, and could be precipitated from aqueous solution by the addition of one volume of ethanol. When collected and dried the precipitate was a fine white powder.

In its hydrolysis behaviour with acids and in its examination by methylation studies, the polymer generally behaved like a naturally occurring polysaccharide.

In another example, 2-desoxy-D-ribose (0.26 g.) was dissolved in 0.1% methanolic hydrogen chloride (5 c. c.) at 23°. The ensuing reaction was inspected polarimetrically, and after 12 minutes the reaction was arrested by adding silver carbonate and silver oxide. The solution was filtered through a charcoal pad and then concentrated under diminished pressure. The syrupy residue was non-reducing to Fehling's solution and was $\alpha\beta$-methyl 2-desoxy-D-ribofuranoside. On rapid heating distillation resulted (B. P. 115–120° (bath temperature)/0.4 mm.) but on slow heating polymerisation occurred and a hard glassy substance was formed.

Substances produced in accordance with the invention can be used for such purposes as, for example, the production of blood plasma substitutes, gums and mucilages, plastics and fibres.

Having thus described our invention what we claim as new and desire to secure by Letters Patent is:

1. A process for the production of polysaccharides which comprises slowly heating under substantially neutral conditions an alkyl 2-desoxy-glycofuranoside to a temperature at which the corresponding alkyl alcohol is evolved, whereby a condensation product of the 2-desoxy-glycofuranoside is formed.

2. A process for the production of polysaccharides which comprises slowly heating under substantially neutral condition a methyl 2-desoxy-glycofuranoside to a temperature at which methyl alcohol is evolved, whereby a condensation product of the 2-desoxy-glycofuranoside is formed.

3. A process for the production of polysaccharides which comprises slowly heating under substantially neutral conditions an alkyl 2-desoxy-pentofuranoside to a temperature at which the corresponding alkyl alcohol is evolved, whereby a condensation product of the 2-desoxy-pentofuranoside is formed.

4. A process for the production of polysaccharides which comprises slowly heating under substantially neutral conditions a methyl 2-desoxy-pentofuranoside to a temperature at which methyl alcohol is evolved, whereby a condensation product of the 2-desoxy-pentofuranoside is formed.

5. A process for the production of polysaccharides which comprises slowly heating under substantially neutral conditions $\alpha\beta$-methyl 2-desoxy-D-ribofuranoside to a temperature at which methyl alcohol is evolved, whereby a condensation product of 2-desoxy-D-ribofuranoside is formed.

6. A process for the production of polysaccharides which comprises slowly heating under substantially neutral conditions an alkyl 2-desoxy-hexofuranoside to a temperature at which the corresponding alkyl alcohol is evolved, whereby a condensation product of the 2-desoxy-hexofuranoside is formed.

7. A process for the production of polysaccharides which comprises slowly heating under substantially neutral conditions a methyl 2-desoxy-hexofuranoside to a temperature at which the methyl alcohol is evolved, whereby a condensation product of the 2-desoxy-hexofuranoside is formed.

8. A process for the production of polysaccharides which comprises slowly heating under substantially neutral conditions $\alpha\beta$-methyl 2-desoxy-D-galactofuranoside to a temperature at which methyl alcohol is evolved, whereby a condensation product of 2-desoxy-D-galactofuranoside is formed.

9. A hard glassy polymer having a polysaccharide structure consisting of 2-desoxy-glycofuranose units linked together through head and tail carbon atoms.

10. A hard glassy polymer having a polysaccharide structure consisting of 2-desoxy-pentofuranose units linked together through $C_1$ and $C_5$.

11. A hard glassy polymer having a polysaccharide structure consisting of 2-desoxy-hexofuranose units linked together through $C_1$ and $C_6$.

12. A hard glassy polymer having a polysaccharide structure consisting of 2-desoxy-D-galactofuranose units linked together through $C_1$ and $C_6$.

13. A hard glassy polymer having a polysaccharide structure consisting of 2-desoxy-D-ribofuranose units linked together through $C_1$ and $C_5$.

MAURICE STACEY.
WILLIAM GEORGE OVEREND.

References Cited in the file of this patent

UNITED STATES PATENTS

| Number | Name | Date |
|---|---|---|
| 2,355,245 | Schreiber | Aug. 8, 1944 |
| 2,390,507 | Cantor | Dec. 11, 1945 |